US011630556B2

(12) United States Patent
Zamora Duran et al.

(10) Patent No.: US 11,630,556 B2
(45) Date of Patent: Apr. 18, 2023

(54) FINGER CONTROL OF WEARABLE DEVICES

(71) Applicant: KYNDRYL, INC., New York, NY (US)

(72) Inventors: Edgar Adolfo Zamora Duran, Heredia (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 283 days.

(21) Appl. No.: 17/022,651

(22) Filed: Sep. 16, 2020

(65) Prior Publication Data

US 2022/0083182 A1 Mar. 17, 2022

(51) Int. Cl.
| | |
|---|---|
| *G06F 3/0484* | (2022.01) |
| *G06K 9/62* | (2022.01) |
| *G06V 10/75* | (2022.01) |
| *G06V 20/64* | (2022.01) |
| *G06V 40/10* | (2022.01) |

(52) U.S. Cl.
CPC ......... *G06F 3/0484* (2013.01); *G06K 9/6217* (2013.01); *G06V 10/751* (2022.01); *G06V 20/64* (2022.01); *G06V 40/107* (2022.01)

(58) Field of Classification Search
CPC .. G06F 3/04842; G06F 3/0346; G06F 21/316; G06F 3/0442; G06F 3/04812; G06F 3/0488; G06T 7/70; G06T 3/20; G06V 40/113; G06V 40/12; G01S 13/66; G06N 20/00; H04W 4/14; H04N 13/128
See application file for complete search history.

(56) References Cited

U.S. PATENT DOCUMENTS

| | | | |
|---|---|---|---|
| 5,612,719 A | 3/1997 | Beernink | |
| 9,619,049 B2 * | 4/2017 | Bostick | ................. G06F 1/1694 |
| 10,114,342 B2 | 10/2018 | Kim | |
| 10,338,789 B2 | 7/2019 | Ording | |
| 10,620,775 B2 * | 4/2020 | Holz | ................... G06F 3/04812 |
| 10,877,643 B2 * | 12/2020 | Wantland | ............ G06F 3/04842 |
| 11,004,422 B1 * | 5/2021 | Bull | ........................ G09G 5/006 |

(Continued)

FOREIGN PATENT DOCUMENTS

| | | | | |
|---|---|---|---|---|
| AU | 2014218355 A1 * | 4/2015 | ......... | G07F 17/3209 |
| AU | 2019266126 A1 * | 11/2020 | ............. | G06F 3/048 |

(Continued)

OTHER PUBLICATIONS

Ians, "Apple Patents Next-Gen Smartwatch With Biometric 'Touch ID' Support", Published: Feb. 7, 2020, 5 pages, <https://www.india.com/technology/apple-patents-next-gen-smartwatch-with-biometric-touch-id-support-3935502/>.

(Continued)

*Primary Examiner* — Steven P Sax
(74) *Attorney, Agent, or Firm* — Dan Housley; Andrew M. Calderon; Calderon Safran & Cole, P.C.

(57) ABSTRACT

An object approaching a wearable device of a user is identified. In response to determining that the approaching object is a previously identified target of the user, one or more applications displayed in a user interface of the wearable device, and how said one or more applications are organized on the user interface of the wearable device, are modified based on the identified approaching object. The modified user interface is displayed to the user.

20 Claims, 6 Drawing Sheets

(56) References Cited

U.S. PATENT DOCUMENTS

| | | | | |
|---|---|---|---|---|
| 2015/0288944 | A1* | 10/2015 | Nistico | G06T 7/70 345/156 |
| 2016/0070439 | A1* | 3/2016 | Bostick | G06F 3/0304 715/728 |
| 2016/0239105 | A1* | 8/2016 | Bostick | G06F 3/0346 |
| 2016/0320853 | A1* | 11/2016 | Lien | G01S 13/66 |
| 2017/0032168 | A1 | 2/2017 | Kim | |
| 2017/0083230 | A1* | 3/2017 | Reddy | G06V 40/12 |
| 2018/0095653 | A1* | 4/2018 | Hasek | G06F 3/04883 |
| 2018/0181733 | A1 | 6/2018 | Shim | |
| 2019/0196600 | A1* | 6/2019 | Rothberg | G06F 3/017 |
| 2019/0245851 | A1* | 8/2019 | Whaley | G06F 21/316 |
| 2019/0369755 | A1* | 12/2019 | Roper | G06F 3/0442 |
| 2020/0125251 | A1* | 4/2020 | Juarez | G06T 3/20 |
| 2020/0152312 | A1* | 5/2020 | Connor | A61B 5/11 |
| 2020/0341610 | A1* | 10/2020 | Quintana | G06F 3/04855 |
| 2021/0081029 | A1* | 3/2021 | Dong | G06V 40/113 |
| 2021/0231615 | A1* | 7/2021 | Munemoto | G01N 29/036 |

FOREIGN PATENT DOCUMENTS

| | | | | |
|---|---|---|---|---|
| CA | 2983178 | A1 * | 8/2007 | G06F 3/041 |
| CA | 2837470 | A1 * | 12/2012 | A63F 13/06 |
| CN | 101198925 | | 6/2008 | |
| CN | 100421054 | C * | 9/2008 | G06F 3/014 |
| CN | 104182764 | A * | 12/2014 | |
| CN | 104768455 | A * | 7/2015 | A41D 13/1281 |
| CN | 105117687 | A | 12/2015 | |
| CN | 207203052 | U * | 4/2018 | A61H 1/0285 |
| CN | 108509026 | A * | 9/2018 | G06F 3/017 |
| CN | 109240490 | A * | 1/2019 | |
| CN | 110430809 | A * | 11/2019 | A61B 17/155 |
| CN | 110456949 | A * | 11/2019 | G06F 3/048 |
| CN | 110622112 | A * | 12/2019 | G06F 1/1626 |
| JP | 2018506124 | A * | 3/2018 | |
| JP | 2018173987 | A * | 11/2018 | G02B 27/2285 |
| JP | 2020197856 | A * | 12/2020 | |
| KR | 20160030821 | | 3/2016 | |
| KR | 102423120 | B1 * | 7/2022 | |
| TW | 202111488 | A * | 3/2021 | |
| WO | WO-2009093056 | A1 * | 7/2009 | G06F 1/1626 |
| WO | WO-2014154839 | A1 * | 10/2014 | H04N 13/025 |
| WO | WO-2018003861 | A1 * | 1/2018 | G06F 3/017 |
| WO | WO-2020264371 | A1 * | 12/2020 | G06F 3/03545 |

OTHER PUBLICATIONS

Lula, Antonio, "Ultrasound Systems for Biometric Recognition", Sensors, Published online May 20, 2019, doi: 10.3390/s19102317, 22 pages.

Mayhew, Stephen, "InvenSense and Globalfoundries collaborate on ultrasonic fingerprint technology", Biometric, Mar. 13, 2017, 4 pages, <https://www.biometricupdate.com/201703/invensense-and-globalfoundries-collaborate-on-ultrasonic-fingerprint-technology>.

* cited by examiner

FINGER CONTROL OF WEARABLE DEVICES

BACKGROUND

The present invention relates generally to the field of wearable devices, and more particularly to improving finger control of a wearable device.

A wearable device is a smart, electronic device (i.e., an electronic device with one or more micro-controllers) that is worn on or close to the skin. Wearable devices are able to detect, analyze, and transmit information concerning, for example, body signals such as vital signs, and/or ambient data, and which allow in some cases immediate biofeedback to the wearer. One of the simpler wearable devices is an activity or fitness tracker which can track, among other parameters, distances walked or run, calorie intake, heartbeat, and blood pressure. Another popular, more complex, wearable device is the smartwatch. As the name implies, a smartwatch closely resembles a common watch. However, the smartwatch can provide much more information beyond the current time and date. Current smartwatches have functionality comparable to smartphones and include functions such as the ability to interact with mobile applications, play media (including audio and video files), make cellular phone calls, take photographs, determine location via the Global Positioning System (GPS), and many more. Smartwatches can also include accelerometers, heart rate and blood pressure monitors, altimeters, barometers, compasses, pedometers, and various other sensors. One way to interact with a smartwatch is through the digital crown often located on an edge of the smartwatch.

SUMMARY OF THE INVENTION

Embodiments of the present invention include an approach for improving finger control of a wearable device. In one embodiment, an object approaching a wearable device of a user is identified. In response to determining that the approaching object is a previously identified target of the user, one or more applications displayed in a user interface of the wearable device, and how said one or more applications are organized on the user interface of the wearable device, are modified based on the identified approaching object. The modified user interface is displayed to the user.

DETAILED DESCRIPTION

Figure 1:
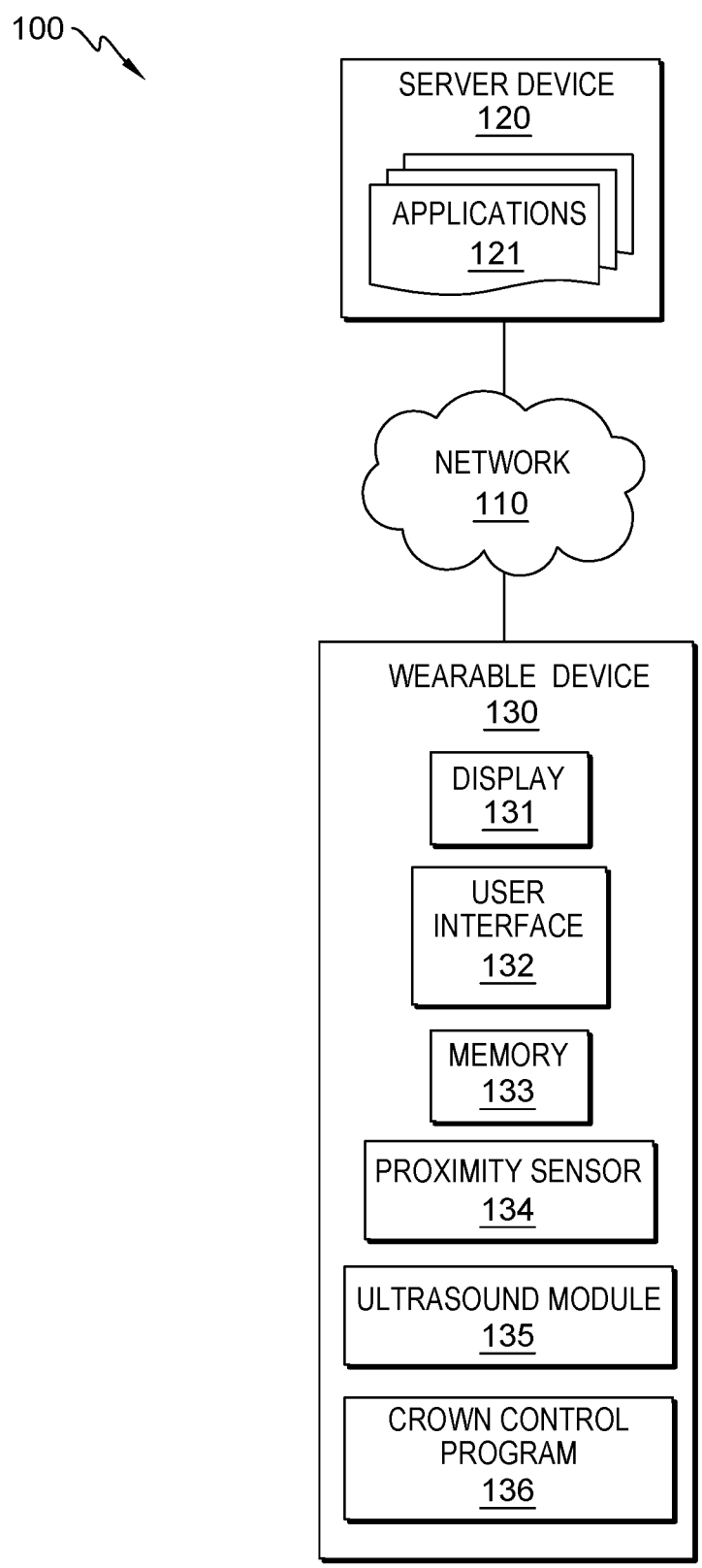
FIG. 1 depicts a functional block diagram illustrating a computing environment which includes a crown control program, in accordance with an embodiment of the present invention.

Embodiments of the present invention recognize that the popularity of wearable devices is increasing with the various advancements being made in the wearable technology. The most successful wearable device on the market is the smartwatch. The smartwatch can replace most, if not all, of the function of a smartphone. Embodiments of the invention recognize that the small display screen on a smartwatch can be a difficult interface to control. One method of interacting with a smartwatch is through a dial located on one edge of the smartphone; this dial is called the digital crown. The size of the digital crown is rather small. For example, on a smartwatch with a forty millimeter long face, the digital crown is just under seven millimeters (or just over one quarter of an inch) in diameter. Interacting with this input device to access all of the various features of the smartwatch may not be straight-forward, especially for someone with poor dexterity or who is vision impaired. Non-impaired, coordinated people may want a method to more quickly access favorite feature or applications on the smartwatch.

Embodiments of the present invention recognize that there may be a method, computer program product, and computer system for improving finger control of a wearable device. The method, computer program product, and computer system improve the wearable device technology by providing for an improved technique to gain access to the wearable device functions and applications (i.e., an improvement in how a user organizes and accesses applications included on the wearable device). Thus, this improvement describes the novelty of the present invention, that being the customization and access of applications in one of a hands-free manner or utilizing the digital crown. A benefit of this improved technique is an easier, faster access to favorite applications, or grouped applications, by the wearable device user. Another benefit is improving the ease of use of an impaired user, for example, one with a sprained thumb who is unable to rotate the digital crown on a smartphone. In an embodiment, an indication of a training mode is received. In the embodiment, a learning mode is initiated. Further in the embodiment, a proximity sensor is activated. Further yet in the embodiment, an ultrasound module is activated. Further yet in the embodiment, a finger, or a portion of a finger, is identified. Further yet in the embodiment, a confirmation of the identified finger, or the portion of the finger, is received. Further yet in the embodiment, an application mapping is received which is associated with the identified finger, or portion of finger. Further yet in the embodiment, the information is stored. Further yet in the embodiment, an approaching object is determined. Further yet in the embodiment, the ultrasound module is reactivated. Further yet in the embodiment, the approaching object is identified. Further yet in the embodiment, responsive to determining that the approaching object is a finger, or a portion of the finger, of the user, the associated application mapping is retrieved. Further yet in the embodiment, the applications included in the mapping are displayed to the user on the wearable device.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and wearable device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with server device 120 and wearable device 130 over network 110.

In embodiments of the present invention, server device 120 and wearable device 130 are connected to network 110, which enables server device 120 and wearable device 130 to access other computing devices and/or data not directly stored on server device 120 and wearable device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between server device 120, wearable device 130, and any other computing devices (not shown in FIG. 1) connected to network 110, in accordance with embodiments of the present invention.

According to an embodiment of the present invention, server device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 120 can be a standalone computing device, a management server, a web server, a mobile computing device, or any other electronic device or computing system capable of receiving, transmitting, and processing data. In other embodiments, server device 120 can represent computing systems utilizing multiple computers as a server system, such as in a cloud computing environment. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. In an embodiment, computing environment 100 includes any number of server device 120. Server device 120 may include internal and external hardware components as depicted and described in further detail with respect to FIG. 4, in accordance with embodiments of the present invention. According to an embodiment of the present invention, server device 120 includes applications 121.

In an embodiment, applications 121 are a plurality of applications included on wearable devices such as wearable device 130 (discussed below). In an embodiment, examples of applications 121 include, but are not limited to, communication applications, health-related applications, financial applications, shopping applications, social media applications, Internet applications, audio/video applications, information applications, productivity applications, and the like. According to an embodiment of the present invention, some of applications 121 may require a credential from the use such as a username and a password. According to the embodiment, some of applications 121 may not require the credential. In an embodiment, applications 121 on server device 120 provide content (e.g., audio and/or video files, text files, image files, animations, data, services, etc.) to wearable device 130 via network 110.

According to an embodiment of the present invention, wearable device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. Wearable technology, such as wearable device 130, are miniature electronic devices that may be worn by the bearer under, with, or on top of clothing, as well as in or connected to glasses, hats, or other accessories. Wearable technologies are especially useful for applications that require more complex computational support than merely hardware coded logics. In one embodiment, the wearable device 130 may be in the form of a head mounted display. The head mounted display may take the form-factor of a pair of glasses. In an embodiment, the wearable computer may be in the form of a smartwatch or a smart tattoo. According to embodiments, wearable device 130 can be a standalone computing device, a management server, a web server, a mobile computing device, or any other electronic device or computing system capable of receiving, transmitting, and processing data. In other embodiments, wearable device 130 can represent computing systems utilizing multiple computers as a server system, such as in a cloud computing environment. In certain embodiments, wearable device 130 represents a computer system utilizing clustered computers and components (e.g., database server computers, application server computers, etc.) that act as a single pool of seamless resources when accessed by elements of computing environment 100. In general, wearable device 130 is representative of any electronic device or combination of electronic devices capable of executing computer readable program instructions. In an embodiment, computing environment 100 includes any number of wearable device 130. Wearable device 130 may include internal and external hardware components as depicted and described in further detail with respect to FIG. 4, in accordance with embodiments of the present invention. According to an embodiment of the present invention, wearable device 130 includes display 131, user interface 132, memory 133, proximity sensor 134, ultrasound module 135, and crown control program 136.

According to an embodiment, display 131 is an electronic visual device for a desktop computer, laptop computer, tablet computer, smartphone, smartwatch, and the like. Display 131 may include a touchscreen which is an input device layered on top of the display for allowing a user to control an electronic device via simple or multi-touch gestures by touching display 131 with a special stylus and/or one or more fingers, or by bringing a finger of a user near display 131. Display 131 displays open programs and applications, such as an email program, allowing a user of wearable device 130 to interact with the open programs and applications via a keyboard, mouse, and buttons (not shown in FIG. 1). Display 131 may be a thin film transistor liquid crystal display (TFT-LCD), a flat panel LED (light emitting diode) display, a cathode ray tube (CRT), or any type of display device known in the art or developed in the future. Display 131 may be connected to wearable device 130 via VGA (video graphics array), DVI (digital video interface), HDMI (High Definition Multi-Media Interface), or any other connection type known in the art or developed in the future. According to an embodiment, display 131 visually presents information to a user of wearable device 130.

In an embodiment, user interface 132 provides an interface between a user of wearable device 130 and crown control program 136. User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between wearable device 130 and crown control program 136. Mobile application software, or an "app," is a computer program designed to run on smartphones, tablet computers and other mobile devices. User interface 132 enables a user of wearable device 130 to interact with applications 121 on server device 120, crown control program 136, any other programs and applications included on wearable device 130 (not shown in FIG. 1), and any other computing devices (not shown in FIG. 1).

According to an embodiment, memory 133 is storage that is written to and/or read by crown control program 136, and any other programs and applications on wearable device 130. In one embodiment, memory 133 resides on wearable device 130. In other embodiments, memory 133 resides on server device 120 or on any other device (not shown in FIG. 1) in computing environment 100, in cloud storage, or on another computing device accessible via network 110. In yet another embodiment, memory 133 represents multiple storage devices within wearable device 130. Memory 133 may be implemented using any volatile or non-volatile storage media for storing information, as known in the art. For example, memory 133 may be implemented with a tape library, optical library, one or more independent hard disk drives, multiple hard disk drives in a redundant array of independent disks (RAID), solid-state drives (SSD), or random-access memory (RAM). Similarly, memory 133 may be implemented with any suitable storage architecture known in the art, such as a relational database, an object-oriented database, or one or more tables. In an embodiment of the present invention, crown control program 136, and any other programs and applications (not shown in FIG. 1) operating on wearable device 130 may store, read, modify, or write data to memory 133. In an embodiment of the present invention, data stored to memory 133 includes, but is not limited to, data stored by crown control program 136 such as application mapping associated with a finger, or a portion of a finger, of a user (i.e., wearer of wearable device 130).

In an embodiment, proximity sensor 134 is a sensor able to detect the presence of nearby objects without any physical contact with said nearby objects. According to an embodiment, proximity sensor 134 may emit an electromagnetic field or a beam of electromagnetic radiation (infrared, for instance), and looks for changes in the field or return signal. The object being sensed is often referred to as the target of the proximity sensor. Proximity sensor 134 can be used to recognize air gestures and hover-manipulations. An array of proximity sensing elements such as proximity sensor 134 can replace vision-camera or depth camera based solutions for hand gesture detection. In an embodiment, proximity sensor 134 is used to detect the presence of a finger, or a portion of a finger, of a wearable device user.

According to an embodiment of the present invention, ultrasound module 135 is a sensor system that utilizes ultrasound to acquire a three-dimensional (3D) image of an object. Ultrasound is sound waves with frequencies higher than the upper audible limit of human hearing. Ultrasound is not different from normal (i.e., audible) sound in its physical properties, except that humans cannot hear ultrasound. Ultrasound devices such as ultrasound module 135 operate with frequencies from twenty kilohertz up to several gigahertz. In an embodiment, ultrasound module 135 is used to acquire a 3D image of a finger, or a portion of a finger, of a user of wearable device 130. An advantage of ultrasound module 135 over other technologies for acquiring 3D images is the capability of collecting volumetric images of the investigated biometrics such as a finger, which produces twofold benefits: the possibility to extract features that are more distinctive and a very strong resistance to spoof attacks. Further, ultrasound images acquired by ultrasound module 135 do not suffer from many kinds of surface contaminations, humidity, or ambient light.

In an embodiment of the present invention, crown control program 136 is a program, a subprogram of a larger program, an application, a plurality of applications, or mobile application software, which functions to improve finger control of a wearable device, thus improving the 'wearable' technology. A program is a sequence of instructions written to perform a specific task. In an embodiment, crown control program 136 runs independently. In other embodiments, crown control program 136 depends on system software and/or other programs (not shown in FIG. 1) to execute. According to an embodiment, crown control program 136 is a cognitive system based on artificial intelligence utilizing machine learning and deep learning that (i) identifies a finger, or a portion of a finger, of a user, (ii) receives a mapping of one or more wearable applications associated with the identified finger, or portion of a finger, and (iii) displays the mapped applications when the identified finger, or portion of a finger, approaches the wearable device (direct touching of the wearable device is not required). In one embodiment, crown control program 136 functions as a stand-alone program residing on wearable device 130. In another embodiment, crown control program 136 works in conjunction with other programs, applications, etc., found in computing environment 100. In yet another embodiment, crown control program 136 resides on other computing devices such as server device 120 in computing environment 100, which are interconnected to wearable device 130 via network 110.

According to an embodiment, crown control program 136 receives an indication of a training mode. In the embodiment, crown control program 136 initiates the training mode for wearable device 130. Further in the embodiment, crown control program 136 activates a proximity sensor. Further in the embodiment, crown control program 136 activates an ultrasound module. Further in the embodiment, crown control program 136 identifies a finger, or a portion of a finger, of a user (i.e., the user wearing wearable device 130). Further in the embodiment, crown control program 136 receives a mapping of one or more applications associated with the identified finger, or portion of finger. Further in the embodiment, crown control program 136 stores the information (i.e., the identified finger, or portion of finger, and the associated mapping of the one or more applications). Further in the embodiment, crown control program 136 determines that an object is approaching the wearable device (e.g., wearable device 130). Further in the embodiment, crown control program 136 reactivates the ultrasound module. Further in the embodiment, crown control program 136 identifies the approaching object via the ultrasound module. Further in the embodiment, responsive to identifying the approaching object as a finger, or a portion of a finger, of the user, crown control program 136 retrieves the mapped applications associated with the finger, or the portion of the finger, of the user. Further in the embodiment, crown control program 136 displays the mapped applications on the display of the wearable device.

Figure 2A:
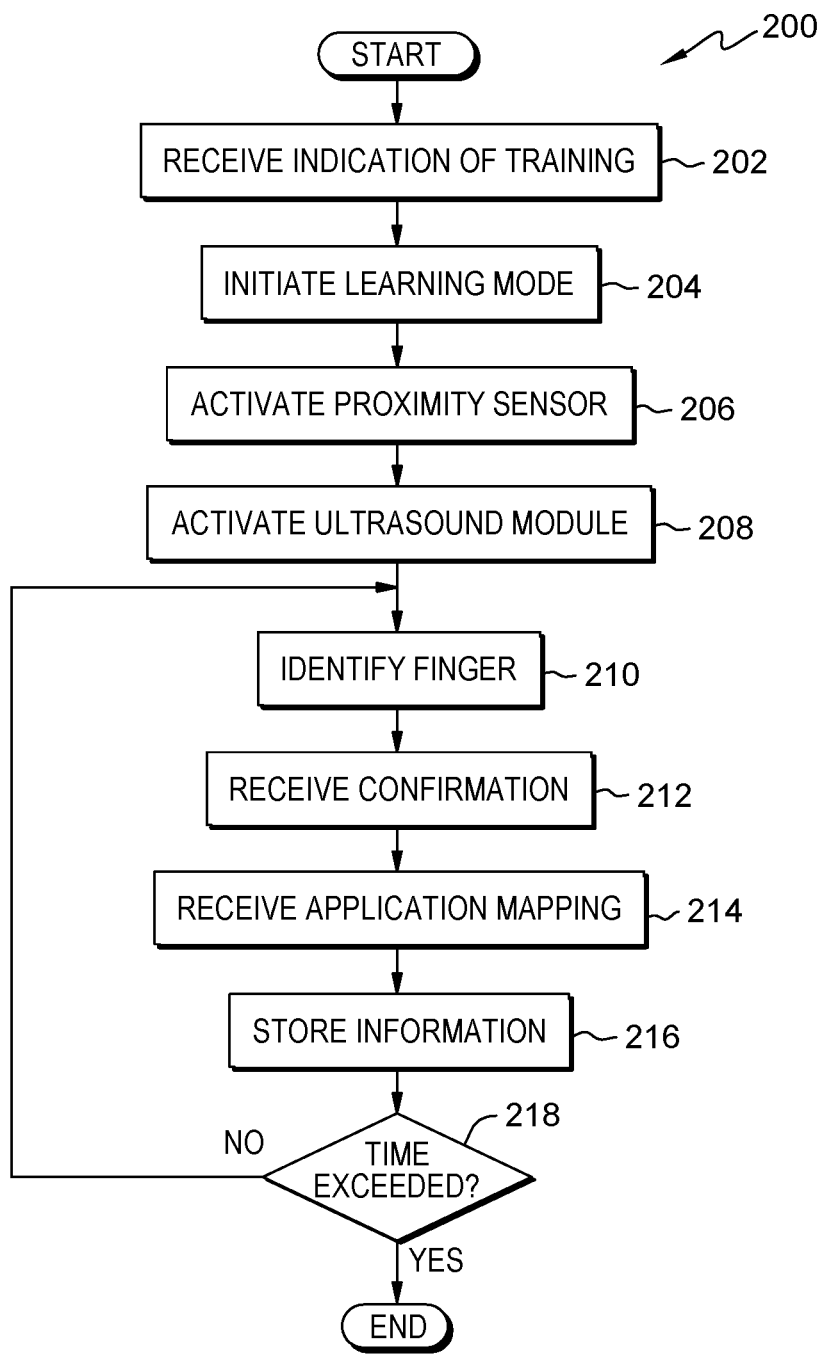
FIG. 2A is a flowchart depicting training steps of a program for improving finger control of a wearable device, on a computing device within the computing environment of FIG. 1, in accordance with an embodiment of the present invention.

FIG. 2A is a flowchart of workflow 200 depicting steps for training a wearable device for improved finger control. Combining workflow 200 with workflow 250 (discussed below) provides the overall method for customizing the wearable device; i.e., improving the organization and access of applications by a user which are included on the wearable device. This customization in how applications are displayed to the user allows the user to group applications in a preferred manner and access the grouped applications either without physically contacting the digital crown or via interacting with the digital crown. In one embodiment, the method of workflow 200 is performed by crown control program 136. In an alternative embodiment, the method of workflow 200 is performed by any other program in computing environment 100 working with crown control program 136. In an embodiment, a user of wearable device 130 invokes workflow 200 upon indicating a training mode (e.g., press and hold of the digital crown). In an alternative embodiment, a user of wearable device 130 invokes workflow 200 upon putting on wearable device 130.

According to an embodiment of the present invention, crown control program 136 receives an indication of training (step 202). In other words, crown control program 136 receives an indication, from a user (i.e., a wearer of wearable device 130), that the user intends to train crown control program 136 to identify one or more fingers, or one or more portions of the one or more fingers, of the user. In an embodiment, crown control program 136 may receive the indication of training by any number of means. Examples of training indications include, but are not limited to, the user opening crown control program 136, the user performing a 'press and hold' of a digital crown, the user tapping the digital crown a specific number of times, the user tapping the face of a smartwatch (when the wearable device is a smartwatch), the user opening an application on a mobile device (such as a smartwatch), and the user utilizing a voice-enabled system of a computing device (such as a tablet computer). According to an embodiment, crown control program 136 on wearable device 130 receives an indication of training by a user. For example, Jill, who recently purchased a new smartwatch, taps the digital crown of the smartwatch three times which indicates to a program on the smartwatch that training of the program by the user is planned.

In an embodiment, crown control program 136 initiates learning mode (step 204). In other words, responsive to receiving the indication of training, crown control program 136 initiates a learning mode of wearable device 130. In an embodiment, crown control program 136 uses at least one of wearable device 130, an available mobile device such as a smartwatch, and an available voice-enabled system of a computing device such as a tablet computer for initiating the learning mode. According to an embodiment, crown control program 136 initiates the learning mode by powering on features of the wearable device and by creating a portion of memory identified by the current date and time in the memory of the wearable device. According to the embodiment, the features that are powered on by crown control program 136 as part of the learning mode are a proximity sensor and an ultrasound module. In an embodiment, crown control program 136 initiates the learning mode of wearable device 130 by powering on proximity sensor 134 and ultrasound module 135; further, crown control program 136 creates a portion of memory 133 on wearable device 130 that is identified by the current date and time. For example, the program on Jill's new smartwatch initiates the learning mode of the smartwatch by powering on its proximity sensor and ultrasound module. The program also creates a folder in the memory of the smartwatch and the created folder is identified by 'Aug. 15, 2020; 10:13 AM'.

According to an embodiment of the present invention, crown control program 136 activates a proximity sensor (step 206). In other words, responsive to providing power to a proximity sensor, such as proximity sensor 134, crown control program 136 activates the proximity sensor for use. In an embodiment, once activated, the proximity sensor begins monitoring the surrounding area for approaching objects such as a face of a user (e.g., the user looking at the wearable device to determine the current time), one or more fingers of the user, and one or more portions of the one or more fingers of the user. According to an embodiment, crown control program 136 activates proximity sensor 134 in wearable device 130. For example, the program on Jill's new smartwatch activates its proximity sensor.

In an embodiment, crown control program 136 activates an ultrasound module (step 208). In other words, responsive to providing power to an ultrasound module, such as ultrasound module 135, crown control program 136 activates the ultrasound module for use. According to an embodiment, once activated, the ultrasound module begins acquiring a three-dimensional (3D) image of any objects detected by the proximity sensor, including attributes and characteristics specific to the detected objects. In an embodiment, crown control program 136 activates ultrasound module 135 on wearable device 130. For example, the program on Jill's new smartwatch activates its ultrasound module.

According to an embodiment of the present invention, crown control program 136 identifies a finger (step 210). In other words, crown control program 136 identifies a target of the user which is one or more fingers, or one or more portions of the one or more fingers, of the user. In an embodiment, the identified fingers are on the opposite hand of the user from the hand where the wearable device is nearest (e.g., if the user is wearing a smartwatch on the left arm, the identified fingers are on the right hand). In the embodiment, the identified fingers are the index finger, the middle finger, the ring finger, the pinky finger, and the thumb. For the thumb, the identified portions of the thumb are (i) the area between the tip of the thumb and the first thumb knuckle (i.e., the first portion) and (ii) the area between the first and the second knuckle of the thumb (i.e., the second portion). For the remaining four fingers, the identified portions of the fingers are (i) the area between the tip of the finger and the first finger knuckle (i.e., the first portion), (ii) the area between the first and the second finger knuckles (i.e., the second portion), and (iii) the area between the second and the third finger knuckles (i.e., the third portion). The finger, or portion of the finger, is identified based on the 3D image acquired by the ultrasound module. The identification is based on attributes of the finger as determined by the ultrasound module; attributes include, but are not limited to, the overall length of the finger, the length of the portion of the finger, the diameter of the finger, and any identifying mark (e.g., a scar) included on the finger or the portion of the finger. According to an embodiment, crown control program 136 identifies one or more fingers, or one or more portions of the one or more fingers, of the user based on the 3D image acquired by ultrasound module 135 on wearable device 130. For example, the program on Jill's smartwatch identifies the following of Jill's fingers: (i) Jill's index finger, (ii) Jill's pinky finger, and (iii) the first portion of Jill's index finger.

In an embodiment, crown control program 136 receives confirmation (step 212). In other words, responsive to identifying the user's one or more fingers, or one or more portions of the user's one or more fingers, crown control program 136 receives a confirmation from the user. According to an embodiment of the present invention, the confirmation is one of affirmative (i.e., the identification by crown control program 136 was correct) or negative (i.e., the identification by crown control program 136 was not correct). For a negative, or incorrect confirmation, crown control program 136 attempts another identification. For a positive, or correct confirmation, crown control program 136 waits to receive an input from the user. In an embodiment, crown control program 136 receives a confirmation from the user for the identified one or more fingers, or the identified one or more portions of the identified one or more fingers, of the user (i.e., the wearer of wearable device 130). For example, the program on Jill's new smartwatch receives a confirmation from Jill for each of the identification of Jill's index finger, Jill's pinky finger, and the first portion of Jill's index finger.

According to an embodiment of the present invention, crown control program 136 receives application mapping (step 214). In other words, responsive to receiving a positive confirmation from the user, crown control program 136 receives an application mapping from the user. In an embodiment, the received application mapping is associated with the identified one or more fingers, or the identified one or more portions of the identified one or more fingers, of the user. By providing the application mapping, the user is indicating, for each identified finger, or portion of finger, the one or more applications and functions to be associated with the finger or portion of finger. According to an embodiment, crown control program 136 receives an application mapping from the wearer of wearable device 130 for each of the identified fingers, or portion of fingers, of the wearer. For example, the program on Jill's new smartwatch receives the following application mapping: (i) Jill's home screen applications are mapped to Jill's index finger after identification of Jill's index finger is confirmed, (ii) a phone application, ready to dial '9-1-1', is mapped to Jill's pinky finger after confirmation of Jill's pinky finger is confirmed, and (iii) Jill's social media applications are mapped to the first portion of Jill's index finger after identification of the first portion of Jill's index finger is confirmed.

In an embodiment, crown control program 136 stores information (step 216). In other words, responsive to receiving the application mapping, crown control program 136 stores the identified finger, or portion of finger, and the associated mapping of applications. According to an embodiment, crown control program 136 stores the information to a local memory, such as memory 133. According to another embodiment, crown control program 136 stores the information to any memory accessible by crown control program 136 via network 110. In an embodiment, crown control program 136 stores the identified finger, or portion of finger, and the associated application mapping, to memory 133 on wearable device 130. For example, the program on Jill's new smartwatch stores the following information to a memory included on the smartwatch: (i) home screen applications are mapped to Jill's index finger, (ii) the phone application, ready to dial '9-1-1', is mapped to Jill's pinky finger, and (iii) social media applications are mapped to the first portion of Jill's index finger.

According to an embodiment of the present invention, crown control program 136 determines whether a time is exceeded (decision step 218). In other words, responsive to storing the identified finger, or portion of finger and the associated application mapping, crown control program 136 determines whether a pre-defined time limit is exceeded. In an embodiment, exceeding the time limit indicates that the training is completed and not exceeding the time limit indicates that the training will continue. In one embodiment (decision step 218, NO branch), crown control program 136 determines that the pre-defined time limit is not exceeded; therefore, crown control program 136 returns to step 210 to identify another finger, or another portion of a finger. In the embodiment (decision step 218, YES branch), crown control program 136 determines that the pre-defined time limit is exceeded, therefore, crown control program 136 ends the training and closes.

Figure 2B:
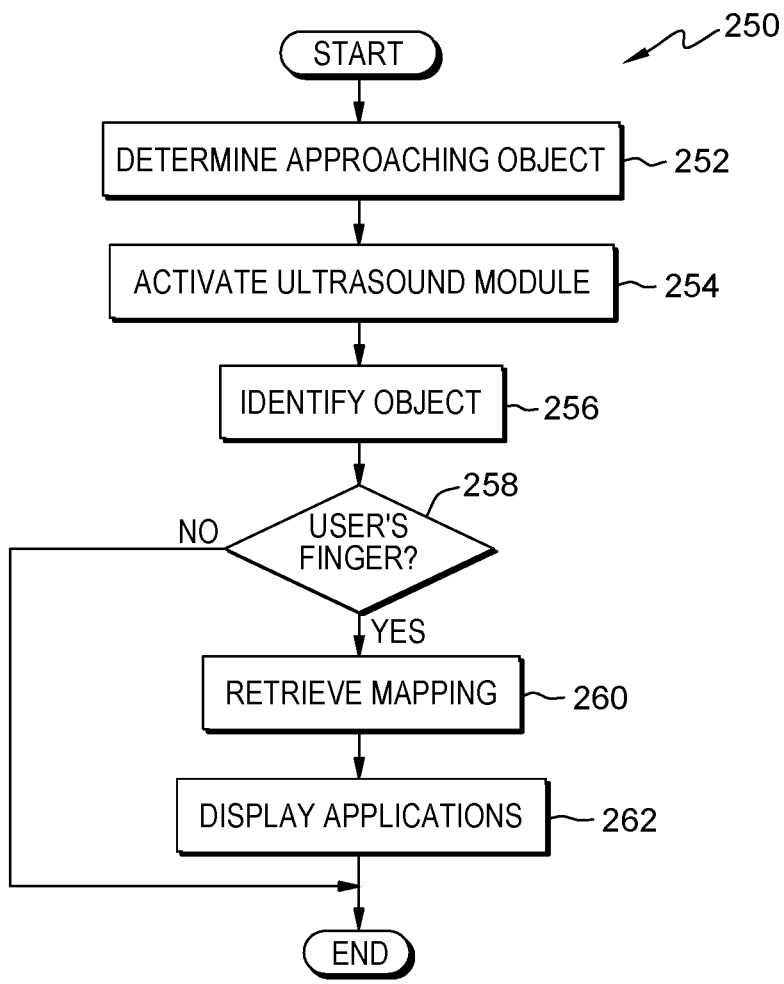
FIG. 2B is a flowchart depicting operational steps of a program for improving finger control of a wearable device, on a computing device within the computing environment of FIG. 1, in accordance with an embodiment of the present invention.

FIG. 2B is a flowchart of workflow 250 depicting operational steps for using a digital crown control program for improved finger control of a wearable device. As previously mentioned, combining workflow 200 (discussed above) with workflow 250 provides for an improvement in the customization of the wearable device by the user. Said user is able to organize the applications on the wearable device in a preferred manner and access the organized applications faster without physically contacting the digital crown (i.e., hands-free) or via interaction with the digital crown. In one embodiment, the method of workflow 250 is performed by crown control program 136. In an alternative embodiment, the method of workflow 250 is performed by any other program in computing environment 100 working with crown control program 136. In an embodiment, a user of wearable device 130 invokes workflow 250 upon ending a training mode of crown control program 136. In an alternative embodiment, a user of wearable device 130 invokes workflow 250 upon putting on wearable device 130.

In an embodiment, crown control program 136 determines an approaching object (step 252). In other words, crown control program 136 determines that some type of object approaching wearable device 130. According to an embodiment, crown control program 136 uses a proximity sensor to determine that an object is approaching. According to another embodiment, crown control program 136 uses any detection technology known in the art to determine that an object is approaching. In an embodiment, crown control program 136 uses proximity sensor 134 on wearable device 130 to determine that an object is approaching. For example, a proximity sensor on Jill's new smartwatch determines that an object is approaching said smartwatch.

According to an embodiment of the present invention, crown control program 136 activates an ultrasound module (step 254). In other words, responsive to determining that an object is approaching, crown control program 136 activates an ultrasound module. In an embodiment, the ultrasound module attempts to acquire a three-dimensional (3D) image of the approaching object for purposes of identifying said object. According to an embodiment, crown control program 136 activates ultrasound module 135 on wearable device 130. For example, the program on Jill's new smartwatch activates an ultrasound module integrated into said smartwatch.

In an embodiment, crown control program 136 identifies object (step 256). In other words, responsive to activating the ultrasound module, crown control program 136 attempts to identify the approaching object by capturing a 3D image of said object. According to an embodiment, crown control program 136 acquires (i.e., captures) a 3D image of the approaching object using ultrasound. According to another embodiment, crown control program 136 acquires a 3D image of the approaching object using any object recognition technology known in the art. In the embodiment, based on the acquired 3D image, crown control program 136 identifies the object using any object recognition technology known in the art. In an embodiment, crown control program 136 identifies the object approaching wearable device 130 using ultrasound module 135. For example, the program on Jill's new smartwatch uses ultrasound imaging to identify the object approaching said smartwatch; in the example, the identified object is the first portion of Jill's index finger.

According to an embodiment, crown control program 136 determines whether the identified object is a finger, or a portion of a finger, of the user (decision step 258). In other words, crown control program 136 compares the acquired 3D image to a plurality of stored 3D images retrieved from memory that were identified in one or more training sessions and compares the acquired 3D image to the stored 3D images. Based on the comparison, crown control program 136 determines whether the object is a finger, or a portion of a finger, of the wearer of the wearable device (i.e., the user). In one embodiment (decision step 258, NO branch), crown control program 136 determines that the identified object (approaching the wearable device) is not a finger, or a portion of a finger, of the user; therefore, crown control program 136 ends. In the embodiment (decision step 258, YES branch), crown control program 136 determines that the identified object is a finger, or a portion of a finger of the user; therefore, crown control program 136 proceeds to step 260 to retrieve mapping.

In an embodiment, crown control program 136 retrieves mapping (step 260). In other words, responsive to determining that the identified object is a finger, or a portion of a finger, of the user, crown control program 136 retrieves the stored application mapping associated with the identified finger, or portion of a finger, of the user. According to an embodiment, the application mapping is retrieved from a local memory such as memory 133. According to another embodiment, the application mapping is retrieved from any memory accessible by crown control program 136 via network 110. In an embodiment, crown control program 136 retrieves the application mapping associated with the identified finger, or portion of a finger, of the user from memory 133 on wearable device 130. For example, the program on Jill's new smartphone retrieves, from an internal memory, the application mapping associated with the first portion of Jill's index finger.

According to an embodiment, crown control program 136 displays applications (step 262). In other words, responsive to retrieving the application mapping, crown control program 136 displays the one or more applications and functions included in the application mapping associated with the identified object (i.e., the finger, or the portion of the finger, of the user). In an embodiment, the one or more applications are displayed on a display of the wearable device. According to an embodiment, crown control program 136 displays the one or more applications and functions, as defined by the retrieved application mapping, in display 131 on wearable device 130. For example, the program on Jill's new smartwatch displays Jill's social media applications based on the identification of the first portion of Jill's index finger and the associated application mapping.

Figure 3A:
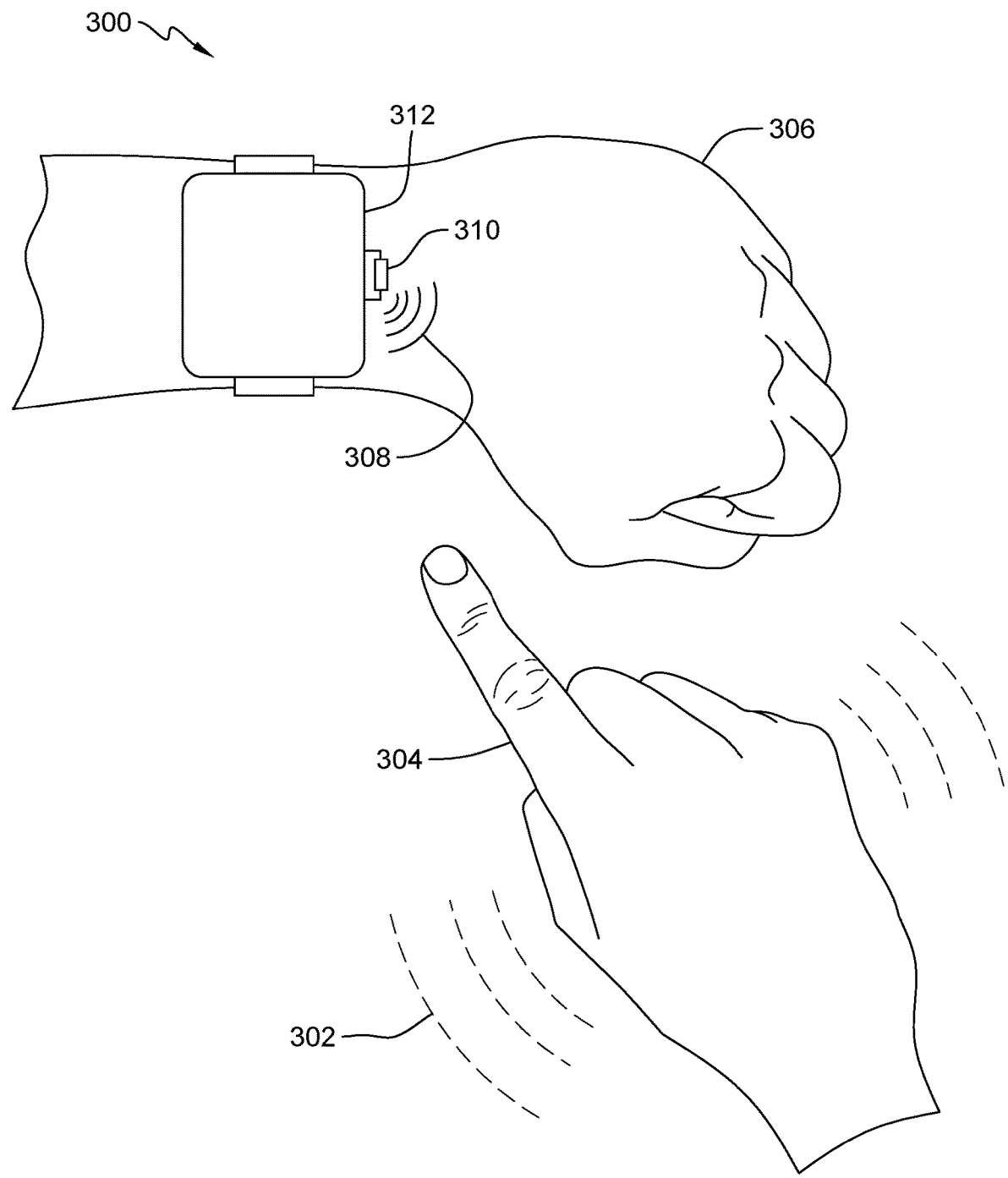
FIG. 3A depicts a first example of a user controlling a smartwatch with an index finger, in accordance with an embodiment of the present invention.

FIG. 3A depicts example 300 of a user controlling a smartwatch with an index finger, according to one embodiment of the present invention. Example 300 includes movement 302 of right hand 304 as right hand 304 approaches left hand 306. Example 300 further includes smartwatch 312 which includes ultrasound module 308 and digital crown 310. In example 300, ultrasound module 308 is activated as right hand 304 gets sufficiently close (e.g., within five inches) to left hand 306. Ultrasound module 308 is acquiring a 3D image of approaching right hand 304.

Figure 3B:
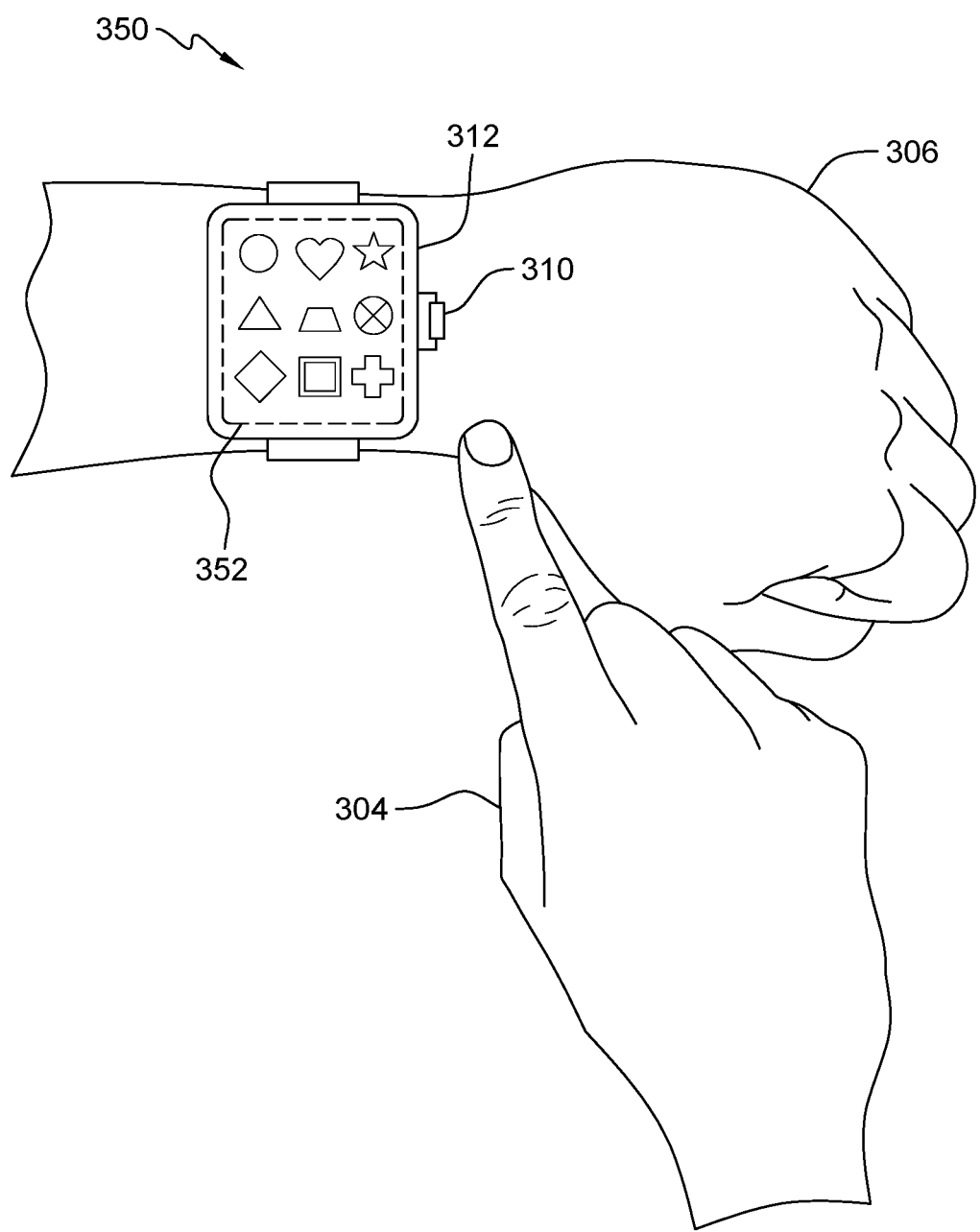
FIG. 3B depicts a second example of a user controlling a smartwatch with an index finger, in accordance with an embodiment of the present invention.

FIG. 3B depicts example 350 of a user controlling a smartwatch with an index finger, according to one embodiment of the present invention. Example 350 includes again right hand 304 (much closer now to smartwatch 312), left hand 306, smartwatch 312, and digital crown 310. In example 350, ultrasound module 308 (not shown in FIG. 3B) has acquired a 3D image of the index finger of right hand 304 and thus, has turned off. Crown control program 136 identifies the 3D image of the index finger of right hand 304 as a finger of the wearer of smartwatch 312. Crown control program 136 retrieves the application mapping associated with the index finger of right hand 304 and dynamically displays applications 352, the one or more applications included in the retrieved application mapping. Touching digital crown 310 by any part of right hand 304 is not required to display applications 352.

Figure 4:
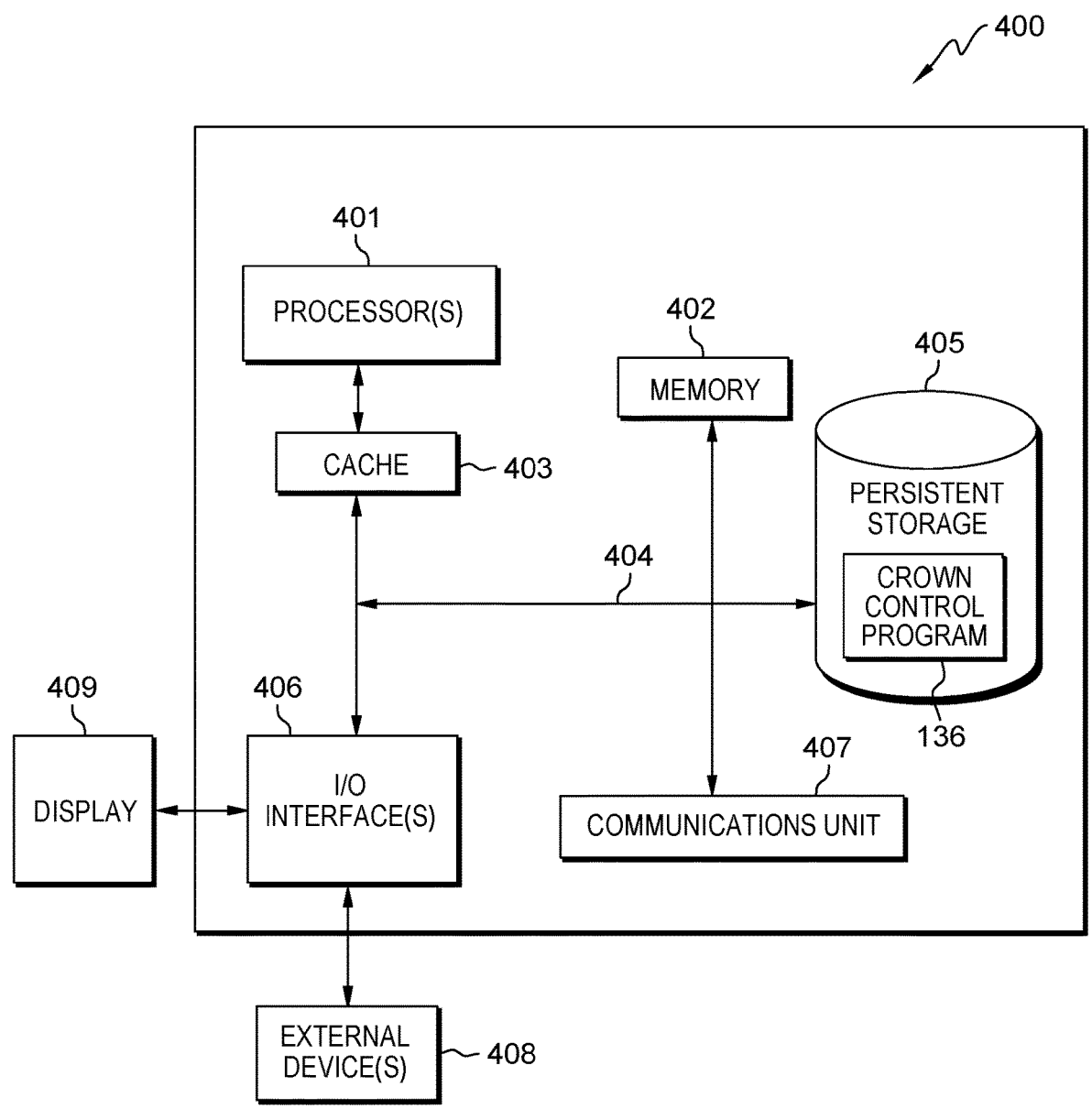
FIG. 4 depicts a block diagram of components of a computing device executing a crown control program within the computing environment of FIG. 1, in accordance with an embodiment of the present invention.

FIG. 4 depicts computer system 400, which is an example of a system that includes crown control program 136. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. PO interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   identifying, by one or more computer processors, an object approaching a wearable device of a user from a three-dimensional image of the approaching object, obtained via an ultrasound module, to match one or more attributes of the three-dimensional image to one or more attributes of a previously identified target of the user, wherein the previously identified target of the user includes one or more portions of one or more fingers, and the one or more attributes include a distinguishing length or mark of the one or more fingers;
   responsive to determining that the approaching object is the previously identified target of the user, accessing, by the one or more computer processors, one or more applications displayed on a user interface of the wearable device, and customizing how said one or more applications are organized on the user interface of the wearable device, based on the identified approaching object;
   incorporating the customized organization of said one or more applications into a learning mode of the wearable device; and
   displaying to the user, by the one or more computer processors, the user interface.

2. The method of claim 1, further comprising:
   determining, by the one or more computer processors, whether the approaching object is the previously identified target of the user by:
   activating, by the one or more computer processors, the ultrasound module included in the wearable device;
   acquiring, by the one or more computer processors the three-dimensional image of the approaching object;
   comparing, by the one or more computer processors, the one or more attributes of the acquired three-dimensional image of the approaching object to the one or more attributes of one or more stored targets including the previously identified target; and
   based on the comparison of the one or more attributes of the acquired three-dimensional image, determining, by the one or more computer processors, whether the approaching object is the previously identified target of the user.

3. The method of claim 2, wherein the one or more stored targets are the one or more fingers, or the one or more portions of the one or more fingers, of the user.

4. The method of claim 2, wherein the one or more attributes of the one or more stored targets comprise an overall length of a finger of the user, the distinguishing length including a length of a portion of the finger of the user, a diameter of the finger of the user, and the mark including one or more identifying marks included on the finger of the user or the portion of the finger of the user.

5. The method of claim 1, further comprising:
   identifying, by the one or more computer processors, a first target of a user based on one or more attributes of the first target;
   receiving, by the one or more computer processors, a confirmation from the user which confirms a correct identification of the identified first target;
   receiving, by the one or more computer processors, an application mapping from the user which associates one or more applications included on the wearable device of the user with the identified first target;
   storing, by the one or more computer processors, the identified first target, the one or more attributes of the identified first target, and the associated application mapping; and
   responsive to determining that a pre-defined time limit has not been exceeded, identifying, by the one or more computer processors, a second target of the user based on one or more attributes of the second target.

6. The method of claim 1, further comprising:
   receiving, by the one or more computer processors, an indication of training of the wearable device;
   initiating, by the one or more computer processors, the learning mode of the wearable device;
   activating, by the one or more computer processors, a proximity sensor included in the wearable device; and activating, by the one or more computer processors, the ultrasound module included in the wearable device responsive to determining that a pre-defined time limit has been exceeded, ending the training of the wearable device.

7. The method of claim 6, wherein at least one of the wearable device, a mobile device such as a smartphone, and a voice-enabled system of a computing device such as a tablet computer are used for the indication of the training and the initiation of the learning mode.

8. A computer program product, the computer program product comprising:

one or more computer readable storage media; and program instructions stored on the one or more computer readable storage media, the program instructions comprising:

program instructions to identify an object approaching a wearable device of a user from a three-dimensional image of the approaching object, obtained via an ultrasound module, to match one or more attributes of the three-dimensional image to one or more attributes of a previously identified target of the user, wherein the previously identified target of the user one or more portions of one or more fingers, and the one or more attributes include a distinguishing length or mark of the one or more fingers;

responsive to determining that the approaching object is the previously identified target of the user, program instructions to access one or more applications displayed on a user interface of the wearable device, and customize how said one or more applications are organized on the user interface of the wearable device from an application mapping of the previously identified target to said one or more applications, based on the identified approaching object;

program instructions to incorporate the customized organization of said one or more applications into a learning mode of the wearable device; and program instructions to display by one or more computer processors, said one or more applications associated with the application mapping on the user interface.

9. The computer program product of claim 8, further comprising program instructions stored on the one or more computer readable storage media, to:

determine whether the approaching object is the previously identified target of the user comprising further program instructions to:

activate the ultrasound module included in the wearable device;

acquire the three-dimensional image of the approaching object;

compare the one or more attributes of the acquired three-dimensional image of the approaching object to the one or more attributes of one or more stored targets including the previously identified target; and based on the comparison of the one or more attributes of the acquired three-dimensional image, determine whether the approaching object is the previously identified target of the user.

10. The computer program product of claim 9, wherein the one or more stored targets are one or more fingers, or one or more portions of the one or more fingers, of the user.

11. The computer program product of claim 9, wherein the attributes of the one or more stored targets comprise an overall length of a finger of the user, the distinguishing length including a length of a portion of the finger of the user, a diameter of the finger of the user, and the mark including one or more identifying marks included on the finger of the user or the portion of the finger of the user.

12. The computer program product of claim 8, further comprising program instructions stored on the one or more computer readable storage media, to:

identify a first target of a user based on one or more attributes of the first target;

receive a confirmation from the user which confirms a correct identification of the identified first target;

receive another application mapping from the user which associates one or more applications included on the wearable device of the user with the identified first target;

store the identified first target, the one or more attributes of the identified first target, and the associated another application mapping; and responsive to determining that a pre-defined time limit has not been exceeded, identify a second target of the user based on one or more attributes of the second target.

13. The computer program product of claim 8, further comprising program instructions stored on the one or more computer readable storage media, to:

receive an indication of training of the wearable device;

initiate the learning mode of the wearable device;

activate a proximity sensor included in the wearable device; and activate the ultrasound module included in the wearable device.

14. The computer program product of claim 13, wherein at least one of the wearable device, a mobile device such as a smartphone, and a voice-enabled system of a computing device such as a tablet computer are used for the indication of the training and the initiation of the learning mode.

15. A computer system, the computer system comprising:

one or more computer processors;

one or more computer readable storage media; and program instructions stored on the one or more computer readable storage media for execution by at least one of the one or more computer processors, the program instructions comprising:

program instructions to identify, by utilizing a machine learning, an object approaching a wearable device of a user from a three-dimensional image of the approaching object, obtained via an ultrasound module, to match one or more attributes of the three-dimensional image to one or more attributes of a previously identified target of the user, wherein the previously identified target of the user one or more portions of one or more fingers, and the one or more attributes include a distinguishing length or mark of the one or more fingers;

responsive to determining that the approaching object is the previously identified target of the user, program instructions to access one or more applications displayed on a user interface of the wearable device, and customize how said one or more applications are organized on the user interface of the wearable device from an application mapping of the previously identified target to said one or more applications, based on the identified approaching object;

incorporating the customized organization of said one or more applications into a learning mode of the wearable device; and program instructions to display by one or more computer processors, said one or more applications associated with the application mapping on the user interface.

16. The computer system of claim 15, further comprising program instructions stored on the one or more computer readable storage media for execution by at least one of the one or more computer processors, to:
determine whether the approaching object is the previously identified target of the user comprising further program instructions to:
activate the ultrasound module included in the wearable device;
acquire the three-dimensional image of the approaching object;
compare the one or more attributes of the acquired three-dimensional image of the approaching object to the one or more attributes of one or more stored targets including the previously identified target; and
based on the comparison of the one or more attributes of the acquired three-dimensional image, determine whether the approaching object is the previously identified target of the user.

17. The computer system of claim 16, wherein the one or more stored targets are one or more fingers, or one or more portions of the one or more fingers, of the user.

18. The computer system of claim 16, wherein the one or more attributes of the one or more stored targets comprise an overall length of a finger of the user, the distinguishing length including a length of a portion of the finger of the user, a diameter of the finger of the user, and the mark including one or more identifying marks included on the finger of the user or the portion of the finger of the user.

19. The computer system of claim 15, further comprising program instructions stored on the one or more computer readable storage media for execution by at least one of the one or more computer processors, to:
identify a first target of a user approaching the wearable device, by utilizing an object recognition technology, based on one or more attributes of the first target;
receive a confirmation from the user which confirms a correct identification of the identified first target;
receive another application mapping from the user which associates one or more applications included on the wearable device of the user with the identified first target;
store the identified first target, the one or more attributes of the identified first target, and the associated another application mapping; and
responsive to determining that a pre-defined time limit has not been exceeded, identify a second target of the user based on one or more attributes of the second target.

20. The computer system of claim 15, further comprising program instructions stored on the one or more computer readable storage media for execution by at least one of the one or more computer processors, to:
receive an indication of training of the wearable device;
initiate the learning mode of the wearable device;
activate a proximity sensor included in the wearable device; and
activate the ultrasound module included in the wearable device.

\* \* \* \* \*